United States Patent [19]

Cheng

[11] Patent Number: 5,617,592
[45] Date of Patent: Apr. 8, 1997

[54] BENDING JOINT OF A COLLAPSIBLE BABY PLAYING BED

[75] Inventor: Ying-Hsiung Cheng, San Diego, Calif.

[73] Assignee: Top Fortune Ltd., San Diego, Calif.

[21] Appl. No.: 616,093

[22] Filed: Mar. 15, 1996

[51] Int. Cl.[6] .................................................. A47D 7/00
[52] U.S. Cl. ............................... 5/99.1; 403/94; 403/97; 403/100; 16/326; 16/329
[58] Field of Search .............................. 403/94, 93, 96, 403/97, 99, 100, 101, 102, 83, 84; 5/99.1, 98.1, 93.1, 98.3; 16/325–329, 332, 335; 256/25–26

[56]  References Cited

U.S. PATENT DOCUMENTS

| 4,619,542 | 10/1986 | Kassai | 403/102 X |
| 5,353,451 | 10/1994 | Hsiung | 5/99.1 |
| 5,377,368 | 1/1995 | Cheng | 403/97 X |
| 5,381,570 | 1/1995 | Cheng | 5/99.1 |
| 5,474,404 | 12/1995 | Chien | 5/99.1 X |
| 5,483,710 | 1/1996 | Chan | 5/99.1 |
| 5,485,655 | 1/1996 | Wang | 5/99.1 X |
| 5,530,977 | 7/1996 | Wang | 16/326 X |
| 5,542,151 | 8/1996 | Stranski et al. | 16/329 X |

Primary Examiner—Harry C. Kim
Attorney, Agent, or Firm—Morton J. Rosenberg; David I. Klein

[57] ABSTRACT

The present invention relates to a bending joint of a collapsible baby playing bed, which comprises:

two inner tooth members each having a tubular portion connected with an upper frame of the bed, and teeth; two fitting blocks each having teeth engaged with the teeth of the tooth members, and two opposing sectorial recesses; a connector having two pairs of opposing sectorial projections engaged with the recesses of the fitting blocks, and a recessed portion; two springs; a push cap fitted on the recessed portion; two bolts each passed through the connector, one the spring, one the fitting block, one the tooth member, and a nut. The bending joint of the bed is first and formost lifted upward to loosen a tight engagement of the teeth of the fitting blocks and the teeth of the tooth members and then the cap is pushed inward so that the sectorial recesses of the fitting blocks can disengage and the inner tooth members can be pivoted downward.

2 Claims, 6 Drawing Sheets

BENDING JOINT OF A COLLAPSIBLE BABY PLAYING BED

BACKGROUND OF THE INVENTION

A collapsible baby playing bed, as shown in FIG. 8, was disclosed in U.S. Pat. No. 5,381,570 and issued on Jan. 17 1995, wherein a bending joint 8, referring to FIGS. 7 and 8, was provided. The bending joint 8 comprises an inner tooth member 81, a spring 82, a fitting block 83, a bending member 84, a bolt 85, and a push cap 86.

In combination, the fitting block 83 is inserted among inner tooth portions 811 of the inner tooth member 81 with a spring 82 being placed between the block 83 and the tooth member 81; the bending member 84 is mounted on the block 83 with opposing sectorial projections 841 thereof being mounted on opposing sectorial recesses 831 of the block 83; the bolt 85 is used for the bending member 84, the fitting block 83, the spring 82, and the tooth member 81 to be screwed together in that sequence; and the cap 86 is fitted on the bending member 84.

A tubular portion 842 of the bending member 84 and a tubular portion 812 of the inner tooth member 81 are connected with an upper frame 9. Because an uppermost portion of the bending joint 8 is arranged to be as high as the bed, an end 91 of each upper frame 9 is bent to be able to be inserted into the tubular portions 842, 812.

The above described combination is known to have disadvantages as follows:

1. the end 91 is bent and so the upper frame 9 requires greater circumferential thickness than a pipe of the same kind with an unbent end to maintain one strength that both the cost and the weight of the bed is undesirably increased;
2. the end 91 bent looks unpleasant aesthetically; and,
3. customers have to pay higher price to buy the bed due to said cost increase.

SUMMARY OF THE INVENTION

The present invention relates to a bending joint which is fitted to an upper frame of a collapsible baby playing bed and which comprises two inner tooth members, two fitting blocks, two springs, a connector, two bolts, and a push cap.

Each tooth member comprises a through hole, a tubular portion, a holding chamber, and a plurality of teeth inside the chamber; each fitting block has a plurality of teeth, a through hole, and two opposing sectorial recesses; the connector has two pairs of opposing sectorial projections, two through holes, a plurality of blocking trenches, and a recessed portion; the push cap 6 has a plurality of blocking hooks on an inside.

In combination, said two bolts are passed through said through holes of the connector, the springs, said through holes of the fitting blocks, said through holes of the inner tooth members in sequence with the teeth of both the blocks and the tooth members toothing together and with the sectorial projections engaging with the sectorial recesses; nuts are screwed on an other end of the bolts; furthermore, the push cap is mounted on the recessed portion of the connector with said blocking hooks being detained by said blocking trenches.

The upper frame is passed into said tubular portions of the tooth members to form a firm connection.

The bending joint of the bed is first and foremost lifted upward to loosen a tight engagement of the teeth of the fitting block and the teeth of the tooth member and then the cap is pushed inward to make the inner tooth members become able to be pivoted downward, the blocking hooks pushing the fitting blocks inward so that the sectorial recesses of the fitting flocks can disengage.

BRIEF DESCRIPTION OF THE DRAWINGS

The invention will be better understood by reference to the accompanying drawings, wherein.

DESCRIPTION OF THE PREFERRED EMBODIMENTS

Figure 1:
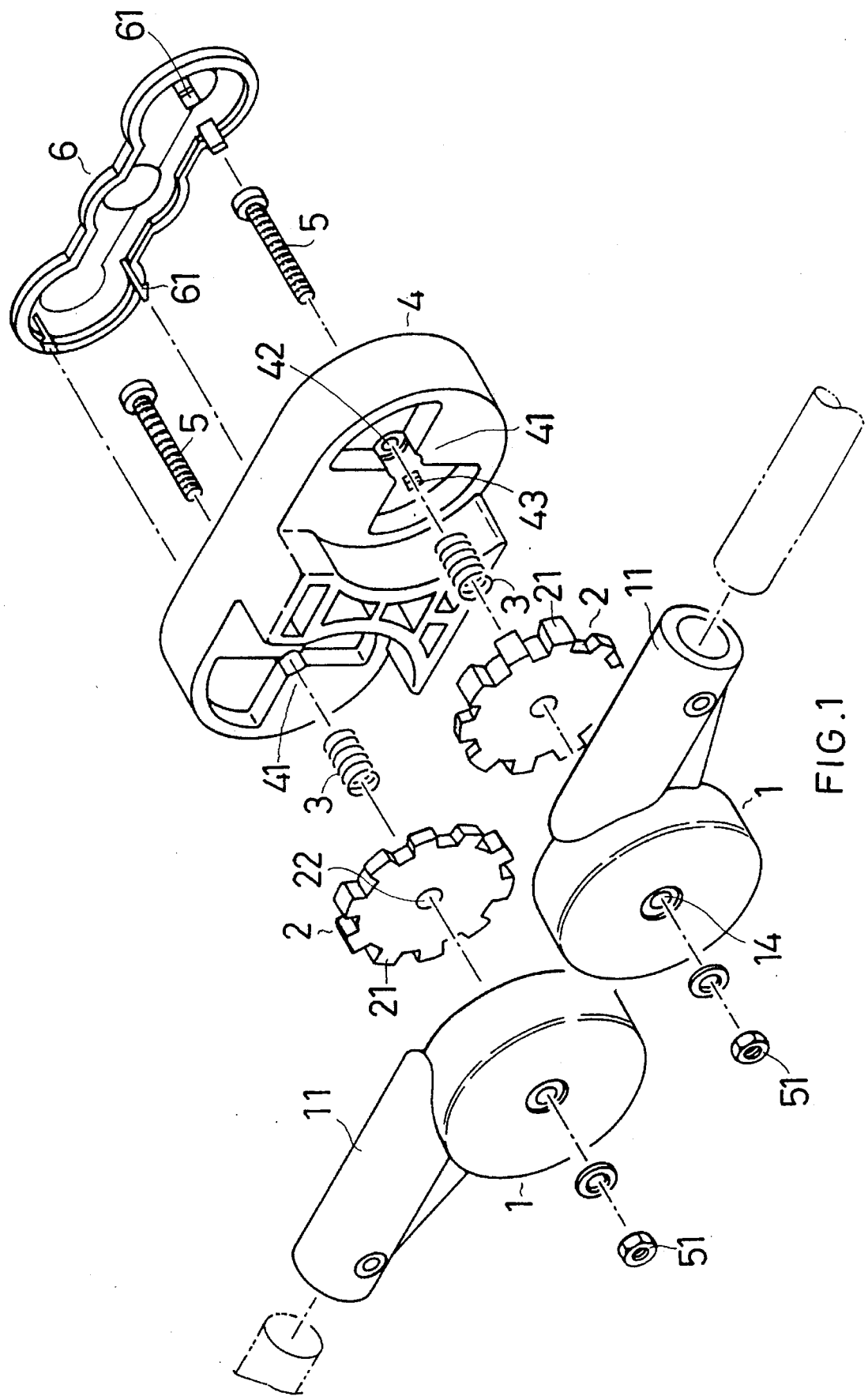
FIG. 1 is an exploded view of a bending joint of the present invention.
Figure 3:
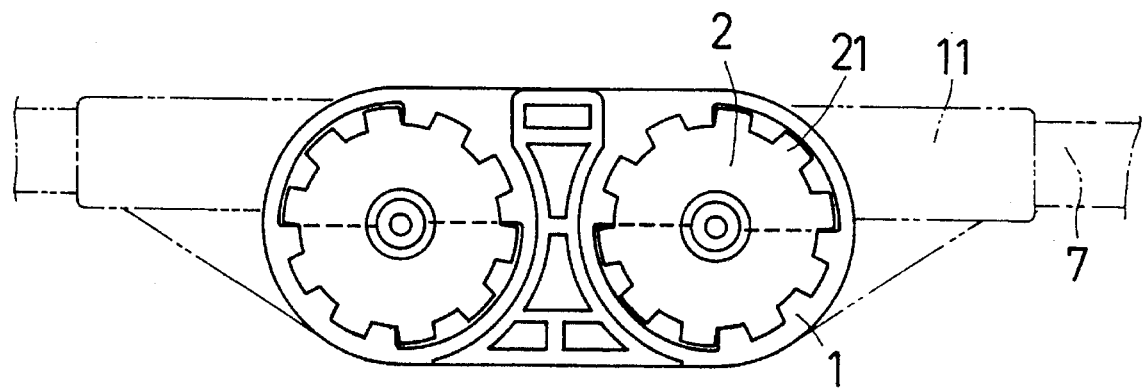
FIG. 3 is a side view of a bending joint of the present invention.
Figure 5:
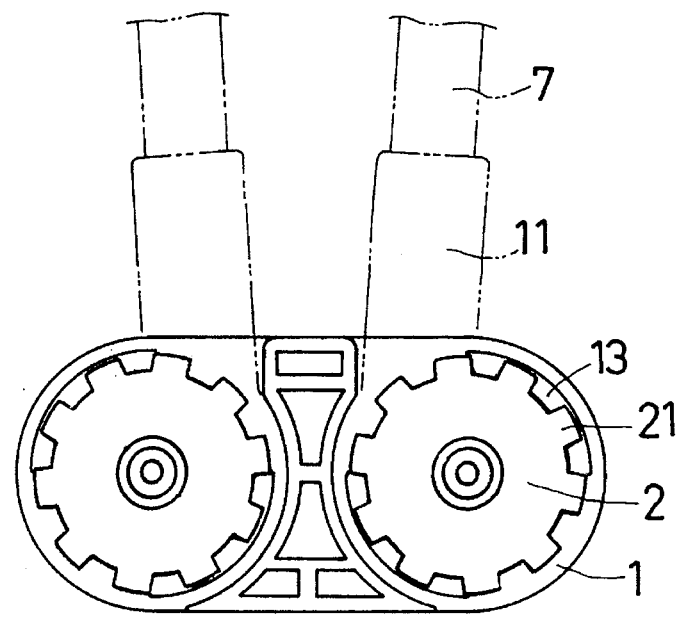
FIG. 5 is a side view of a bent bending joint of the present invention.

A bending joint of the present invention, referring to FIGS. 1, 3, 5, is provided which is fitted to an upper frame 7 of a collapsible baby playing bed and which comprises two inner tooth members 1, two fitting blocks 2, two springs 3, a connector 4, two bolts 5, and a push cap 6.

Figure 2:
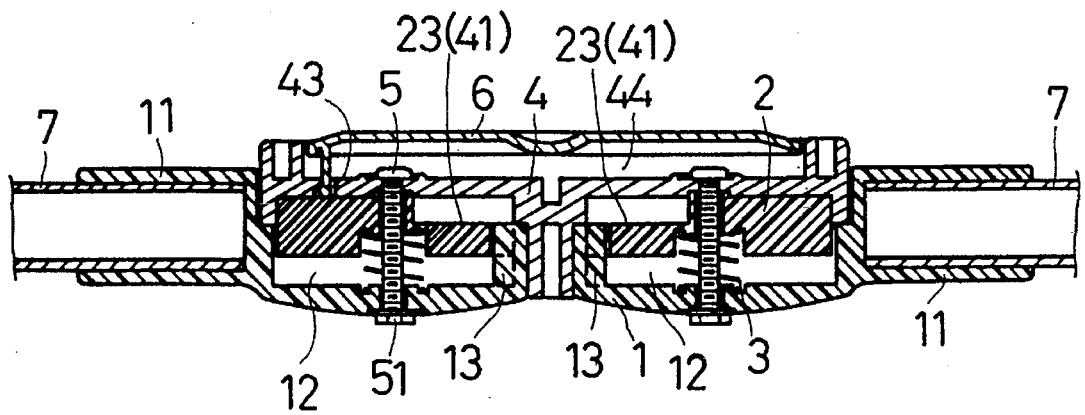
FIG. 2 is a cross-sectional view of a bending joint of the present invention.
Figure 4:
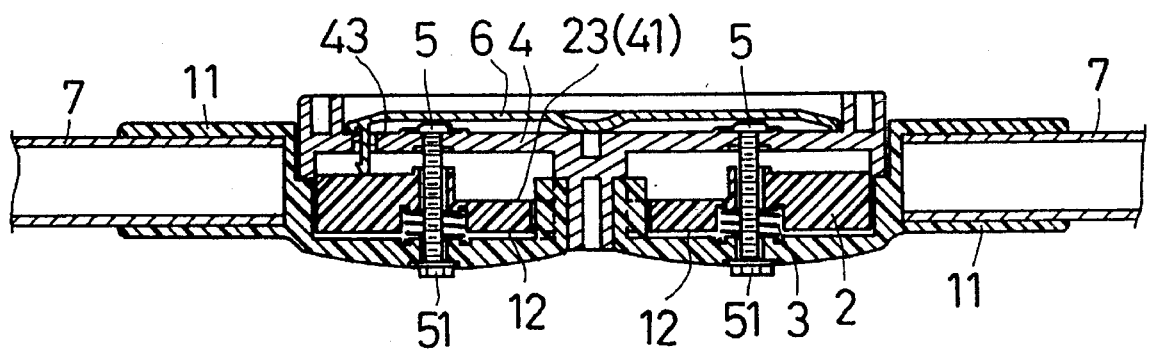
FIG. 4 is a cross-sectional view of a bending joint of the present invention with a push cap being pushed inward.

Referring to FIGS. 1, 2, 5, each tooth member 1 comprises a through hole 14, a tubular portion 11, a holding chamber 12, and a plurality of teeth 13 inside the chamber 12; each fitting block 2 has a plurality of teeth 21 with different thicknesses, a through hole 22, and two opposing sectorial recesses 23; the connector 4 has two pairs of opposing sectorial projections 41, two through holes 42, a plurality of blocking trenches 43 arranged at a proper place, and a recessed portion 44; the push cap 6 has a plurality of blocking hooks 61 on an inside.

In combination, said two bolts 5 are passed through said through holes 42 of the connector 4, the springs 3, said through holes 22 of the fitting blocks 2, said through holes 14 of the inner tooth members 1 in sequence with the teeth 21 and the teeth 13 toothing together and with the sectorial projections 41 engaging with the sectorial recesses 23; nuts 51 and washer (not numbered) are screwed on an other end of the bolts 5; furthermore, the push cap 6 is mounted on the recessed portion 44 of the connector 4 with said blocking hooks 61 being detained from falling off the connector 4 by said blocking trenches 43.

In fitting the bending joint to the upper frame 7, the upper frame 7 is passed into said tubular portions 11 of the tooth members 1 to farm a firm connection.

Figure 6:
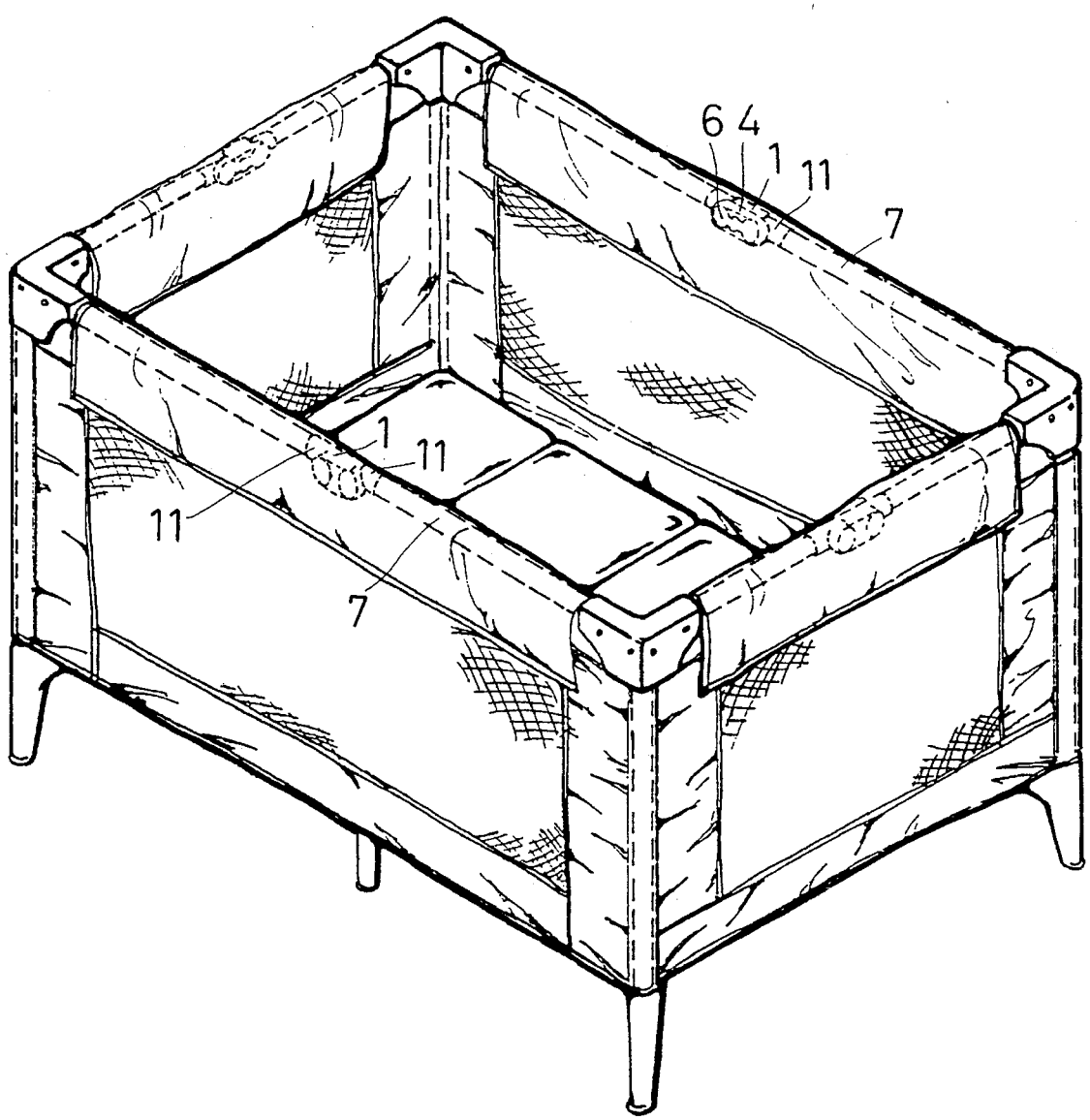
FIG. 6 is a plan of a baby playing bed with bending joints of the present invention.
Figure 7:
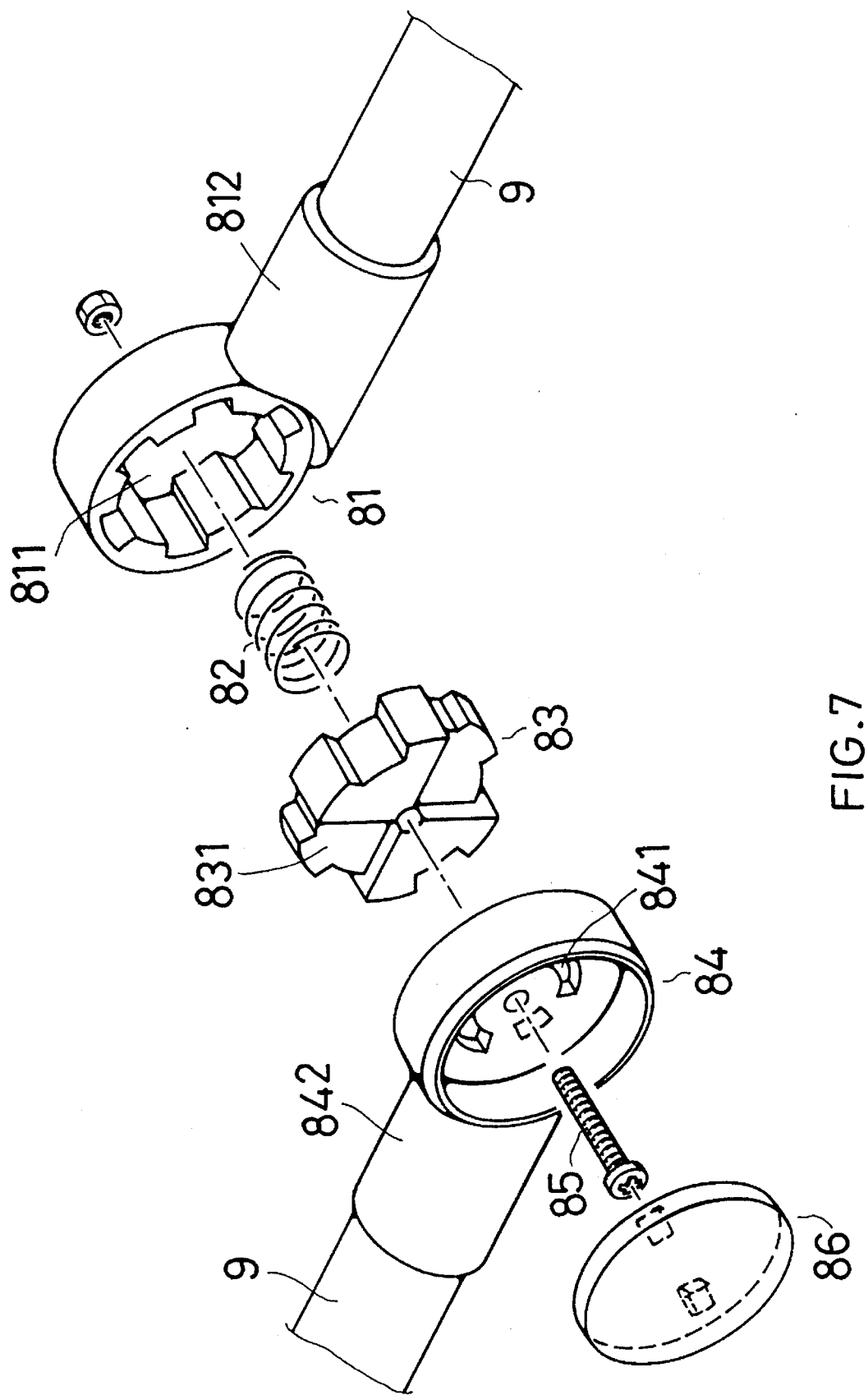
FIG. 7 is an exploded view of a prior art bending joint.
Figure 8:
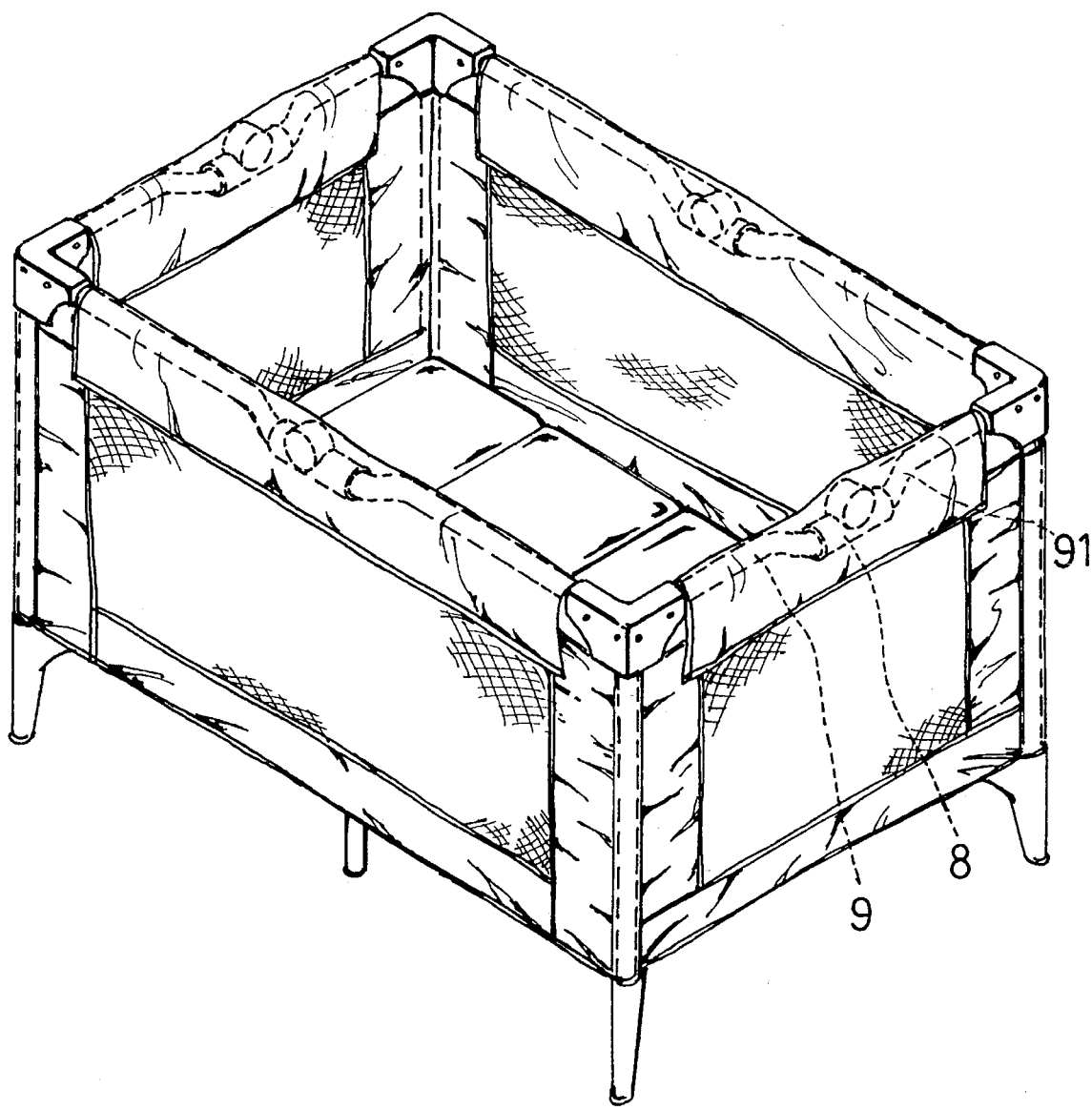
FIG. 8 is a plan of a baby playing bed with prior art bending joints.

The cap 6 is pushed inward to make the inner tooth members 1 become able to be pivoted downward and the blocking hooks 61 pushing the fitting blocks 2 inward so that the sectorial recesses 23 of the fitting blocks 2 can disengage. However, when the bending joint is fitted to the bed and is not bent as shown in FIG. 6, a tight engagement of the teeth 21 and 13 due to gravity makes it difficult to push the cap 6 inward to bend the bending joint so an user has to first and foremost lift the bending joint upward to loosen the tight engagement of the teeth 21 and 13 to make the cap 6 movable.

In collapsing the baby playing bed, the user first lifts the bending joint upward and then pushes the cap 6 inward and pivots the tooth members 1, 1 downward.

From the above description, the bending joint of the present invention is known to have advantages as follows:

1. because the user has to lift the bending joint upward to make the cap 6 inwardly movable, children playing in the bed can be protected from the danger of careless bending of the joint;
2. because the tubular portions 11 are arranged substantially as high as an uppermost portion of the tooth members 1 and the upper frame 7 is connected to the tubular portions 11 without being bent, the bed looks pleasant in an aesthetically pleasing manner;
3. furthermore, because the upper frame 7 is not bent, the strength of the frame 7 is greater than that of a bent one with a same circumferential thickness; thus the frame 7 can be circumferentially thinner to maintain a necessary strength as compared with a bent one.
4. because the upper frame 7 is not bent, it saves cost both in manufacturing and in material and customers can buy the bed for a comparatively lower price.

While the preferred embodiments of the invention have been described above, it will be recognized and understood that various modifications may be made therein and the appended claims are intended to cover all such modifications which may fall within the spirit and scope of the invention.

What is claimed is:

1. In combination, a collapsible baby playing bed having upper frames and a bending joint for pivotally interconnecting two of said upper frames of said bed, wherein said bending joint comprising:

two inner tooth members, wherein each of said two inner tooth members has a through hole, a tubular portion connected to one of said two upper frames of said bed, a holding chamber, and a plurality of teeth disposed inside said holding chamber;

two fitting blocks, wherein each of said two fitting blocks has a plurality of teeth thereon for engaging with said teeth of the respective inner tooth member, a through hole, and two opposing sectorial recesses thereon;

a connector having two sections, wherein each of said two connector sections has a pair of opposing sectorial projections thereon for engaging with said two opposing sectorial recesses of the respective fitting block, a through hole, a plurality of blocking trenches, and a recessed portion;

two springs, wherein each of said two springs is disposed between and abuts one of said two connector sections and the respective fitting block;

two bolts, wherein each of said two bolts passes through said through hole of the respective connector section, one of said two springs, said through hole of the respective fitting block, and said through hole of the respective inner tooth member;

two nuts, wherein each of said two nuts screws onto an end of the respective bolt for securing together and retaining the respective connector section, said one of said springs, the respective fitting block, and the respective inner tooth member on the respective bolt to dispose said two inner tooth members adjacent to each other and to allow said two inner tooth members having the respective two upper frames attached thereto to pivot relative to each other; and a push cap having a plurality of blocking hooks, wherein said push cap fits on said recessed portions of said two connector sections and said plurality of blocking hooks engage said plurality of blocking trenches of said two connector sections to detain the push cap within said recessed portions of said connector sections.

2. The combination of claim 1, wherein said bending joint is lifted upwardly in order for said push cap to be depressed to disengage said sectorial recesses of the fitting blocks from said respective sectorial projections of the connector sections to allow said two inner tooth members to pivot relative to each other.

* * * * *